(12) United States Patent
Morioka

(10) Patent No.: US 9,283,486 B2
(45) Date of Patent: Mar. 15, 2016

(54) SYSTEMS AND METHODS FOR SETTING PRIORITY FOR A NOTIFICATION LIST IN A GAMING SYSTEM

(71) Applicant: DeNA Co., Ltd., Tokyo (JP)

(72) Inventor: Takashi Morioka, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 240 days.

(21) Appl. No.: 14/070,846

(22) Filed: Nov. 4, 2013

(65) Prior Publication Data

US 2014/0128156 A1 May 8, 2014

(30) Foreign Application Priority Data

Nov. 6, 2012 (JP) ................................. 2012-244760

(51) Int. Cl.

| A63F 9/24 | (2006.01) |
| A63F 13/795 | (2014.01) |
| A63F 13/30 | (2014.01) |
| A63F 13/69 | (2014.01) |
| A63F 13/533 | (2014.01) |
| A63F 13/40 | (2014.01) |
| A63F 13/45 | (2014.01) |

(52) U.S. Cl.
CPC .............. *A63F 13/795* (2014.09); *A63F 13/10* (2013.01); *A63F 13/12* (2013.01); *A63F 13/533* (2014.09); *A63F 13/69* (2014.09); *A63F 13/45* (2014.09); *A63F 2300/556* (2013.01); *A63F 2300/5593* (2013.01); *A63F 2300/8064* (2013.01)

(58) Field of Classification Search
CPC ... A63F 13/10; A63F 13/12; A63F 2300/556; A63F 2300/5593; A63F 2300/575
See application file for complete search history.

(56) References Cited

U.S. PATENT DOCUMENTS

| 2006/0121990 A1* | 6/2006 | O'Kelley, II ............ A63F 13/12 463/42 |
| 2012/0157212 A1* | 6/2012 | Kane ....................... A63F 13/10 463/42 |
| 2014/0004955 A1* | 1/2014 | Nahari .................... A63F 13/10 463/42 |

FOREIGN PATENT DOCUMENTS

| JP | 2007-195702 | 8/2007 |
| JP | 2007195702 A | 8/2007 |

OTHER PUBLICATIONS

Saul Hansell, "Clicks for Sale; Paid Placement Is Catching On in Web Searches", Jun. 4, 2001, NYTimes.com, <http://www.nytimes.com/2001/06/04/business/clicks-for-sale-paid-placement-is-catching-on-in-web-searches.html>.*

*Primary Examiner* — Justin Myhr
(74) *Attorney, Agent, or Firm* — Procopio, Cory, Hargreaves & Savitch LLP

(57) ABSTRACT

There is presented a means of making a player more likely to receive a notification notifying the occurrence of a game event. The server device includes: a storage unit; an acceptance processing unit that accepts from a corresponding player terminal a priority display request for displaying a player on a priority basis in a notification candidate list; an update processing unit that performs, when the priority display request is accepted, an update by subtracting data on a consideration charged for the priority display request from data on player information about the player requesting for priority display; a probability setting unit that sets a probability of the player requesting for priority display being selected as a player displayed in the notification candidate list higher than probabilities of other players not requesting for priority display being selected; and a list creating unit that creates the notification candidate list.

5 Claims, 10 Drawing Sheets

FIG. 10

CONDITION SETTING SCREEN

SET PRIORITY DISPLAY CONDITION!

DISPLAY POSITION

1ST POSITION: AMOUNT OF CONSIDERATION ○✕  ○
10TH POSITION: AMOUNT OF CONSIDERATION ○△  ●
20TH POSITION: AMOUNT OF CONSIDERATION ✕△  ○

DISPLAY MODE

BLINK: AMOUNT OF CONSIDERATION ✕○  ●
DISPLAYED AS "RECOMMEND": AMOUNT OF CONSIDERATION ✕△  ○
BACKGROUND COLOR CHANGE: AMOUNT OF CONSIDERATION △○  ○

MESSAGE

⋮

TOTAL AMOUNT: ○✕△□

OK?   YES   NO

… (US 9,283,486 B2)

SYSTEMS AND METHODS FOR SETTING PRIORITY FOR A NOTIFICATION LIST IN A GAMING SYSTEM

CROSS-REFERENCE TO RELATED APPLICATION(S)

This application claims the benefit of Japanese Patent Application No. 2012-244760, filed Nov. 6, 2012, the disclosure of which is hereby incorporated by reference in its entirety.

BACKGROUND OF THE INVENTION

1. Field of the Invention

The present invention relates to a server device and a game program.

2. Description of the Related Art

There is a game in which one event takes place by a plurality of players participating in the event. In particular, there is widely known a game in which a player and his/her friend player can do battle (event) with the same enemy character in cooperation with each other. When the player does battle in cooperation with his/her friend player in such a game, there is a method in which a player having encountered an enemy character requests for cooperation by, for example, transmitting an aid request email to his/her friend player. In addition, there are a method in which a player uses his/her friend player's character as an aid character by paying a predetermined charge, and the like (e.g., JP 2007-195702 A).

SUMMARY OF THE INVENTION

In a game in which a plurality of players perform an event (e.g., a battle) in cooperation with each other, when a certain player notifies his/her friend player of the occurrence of an event (e.g., an aid request notification in a battle), it is a common practice to create a list in which a plurality of players serving as notification candidates are displayed, and provide a notification using the list. In this case, the player on the notifying side selects a predetermined player from among the plurality of players displayed in the notification candidate list, by which the selected player is notified of the occurrence of the event.

On the other hand, a player who wants to participate in an event first needs to be displayed in a notification candidate list of another player and then needs to receive a notification of the occurrence of an event from another player. However, whether the player can actually receive a notification depends on whether the player is displayed in the notification candidate list, and thus, there is almost nothing the player him/herself can do to receive a notification of the occurrence of an event. Hence, when there are very few notifications received, it contributes to the player losing his/her passion for the game. However, a means of increasing the number of notifications received is not sufficiently presented to the player.

The present invention is made in view of such circumstances, and an object of the present invention is to present a means of making a player more likely to receive a notification notifying the occurrence of an event in a game in which an event where a plurality of players participate takes place.

The main aspect of the present invention to solve the above-described problem is directed to a server device connected to a plurality of player terminals through a network and controlling a game that causes an event where a plurality of players can participate to occur, the server device including: a storage unit that stores data on player information including information about an amount of virtual currency possessed by each player in the game; an acceptance processing unit that accepts from a corresponding player terminal a priority display request for displaying a player on a priority basis in a notification candidate list in which are displayed players serving as candidates for notification destinations to notify of occurrence of an event; an update processing unit that performs, when the priority display request is accepted, an update by subtracting data on a consideration charged for the priority display request from data on player information about the player requesting for priority display, and allowing the storage unit to store the data on the player information; a probability setting unit that sets a probability of the player requesting for priority display being selected as a player displayed in the notification candidate list higher than probabilities of other players not requesting for priority display being selected; and a list creating unit that creates the notification candidate list in which a plurality of players selected based on the probabilities set by the probability setting unit are displayed as players serving as candidates for notification destinations.

Other features of the present invention will become apparent from the description of the present specification and the accompanying drawings.

According to the present invention, in a game in which an event where a plurality of players participate takes place, a player becomes more likely to receive a notification notifying the occurrence of the event.

BRIEF DESCRIPTION OF THE DRAWINGS

FIG. 10 is a diagram showing an example of a condition setting screen displayed upon making a priority display request.

DETAILED DESCRIPTION OF THE INVENTION

Figure 1:
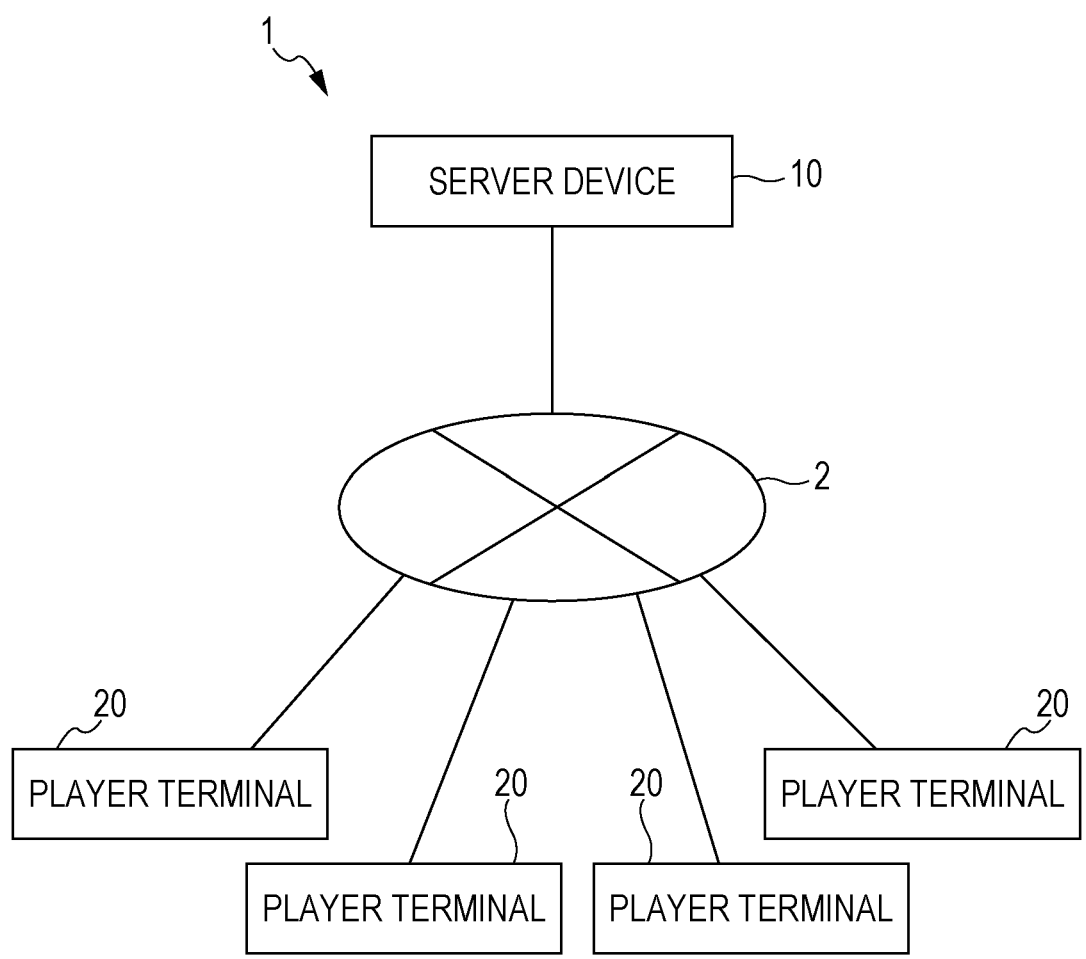
FIG. 1 is a diagram showing an example of an overall configuration of a game system 1 according to embodiments.

At least the following matters will become apparent from the description of the present specification and the accompanying drawings.

A server device connected to a plurality of player terminals through a network and controlling a game that causes an event where a plurality of players can participate to occur, the server device being characterized by including: a storage unit that stores data on player information including information about an amount of virtual currency possessed by each player in the game; an acceptance processing unit that accepts from a corresponding player terminal a priority display request for displaying a player on a priority basis in a notification candidate list in which are displayed players serving as candidates for notification destinations to notify of occurrence of an event; an update processing unit that performs, when the priority display request is accepted, an update by subtracting data on a consideration charged for the priority display request from data on player information about the player requesting for priority display, and allowing the storage unit to store the data on the player information; a probability setting unit that sets a probability of the player requesting for priority display being selected as a player displayed in the notification candidate list higher than probabilities of other players not requesting for priority display being selected; and a list creating unit that creates the notification candidate list in which a plurality of players selected based on the probabilities set by the probability setting unit are displayed as players serving as candidates for notification destinations.

According to such a server device, in a game in which an event where a plurality of players participate takes place, a player becomes more likely to receive a notification notifying the occurrence of the event.

In addition, in the server device, the probability setting unit may change the probability of the player requesting for priority display being selected as a player displayed in the notification candidate list, according to a magnitude of consideration charged for the priority display request.

According to such a server device, a player making a priority display request can receive a notification notifying the occurrence of an event while taking into account the amount of virtual currency possessed thereby. Thus, the player can more efficiently get the opportunity to participate in the event.

In addition, in the server device, when the player requesting for priority display is selected as a player displayed in the notification candidate list by paying the consideration, the list creating unit may change one or both of a display position and a display mode for when the player requesting for priority display is displayed in the notification candidate list, according to a magnitude of consideration charged for the priority display request.

According to such a server device, a player making a priority display request can get a greater opportunity to participate in an event, according to the amount of consideration.

In addition, in the server device, when the player requesting for priority display is selected as a player displayed in the notification candidate list by paying the consideration, the acceptance processing unit may provide a prize for having been selected in the notification candidate list, to the player requesting for priority display.

According to such a server device, since a prize can be obtained only by making a priority display request, it gives a player an incentive to actively participate in an event. Thus, the number of players participating in the event can be increased easily, enabling the game to be more active.

In addition, there is disclosed a game program causing an information processing device to perform a game causing an event where a plurality of players can participate to occur, the game program being characterized by causing the information processing device to perform: a process of storing, in a storage unit, data on player information including information about an amount of virtual currency possessed by each player in the game; a process of accepting from a player terminal a priority display request for displaying a player on a priority basis in a notification candidate list in which are displayed players serving as candidates for notification destinations to notify of occurrence of an event; a process of performing, when the priority display request is accepted, an update by subtracting data on a consideration charged for the priority display request from data on player information about the player requesting for priority display, and allowing the storage unit to store the data on the player information; a process of setting a probability of the player requesting for priority display being selected as a player displayed in the notification candidate list higher than probabilities of other players not requesting for priority display being selected; and a process of creating the notification candidate list in which a plurality of players selected based on the set probabilities are displayed as players serving as candidates for notification destinations.

First Embodiment

For the Configuration of a Game System

FIG. 1 is a diagram showing an example of an overall configuration of a game system 1 according to the present embodiment. The game system 1 provides users (hereinafter, also called "players") with various types of services regarding games (social games) through a network 2. The game system 1 is configured to include a server device 10 and a plurality of player terminals 20 which are connected to the network 2 in a communicable manner.

A player can play a game transmitted through the network 2, by accessing the game system 1 from a player terminal 20. In addition, the player can communicate with a plurality of other players by accessing the game system 1.

<Server Device 10>

The server device 10 is an information processing device which is used when a system administrator, etc., operate and manage game services.

Figure 2:
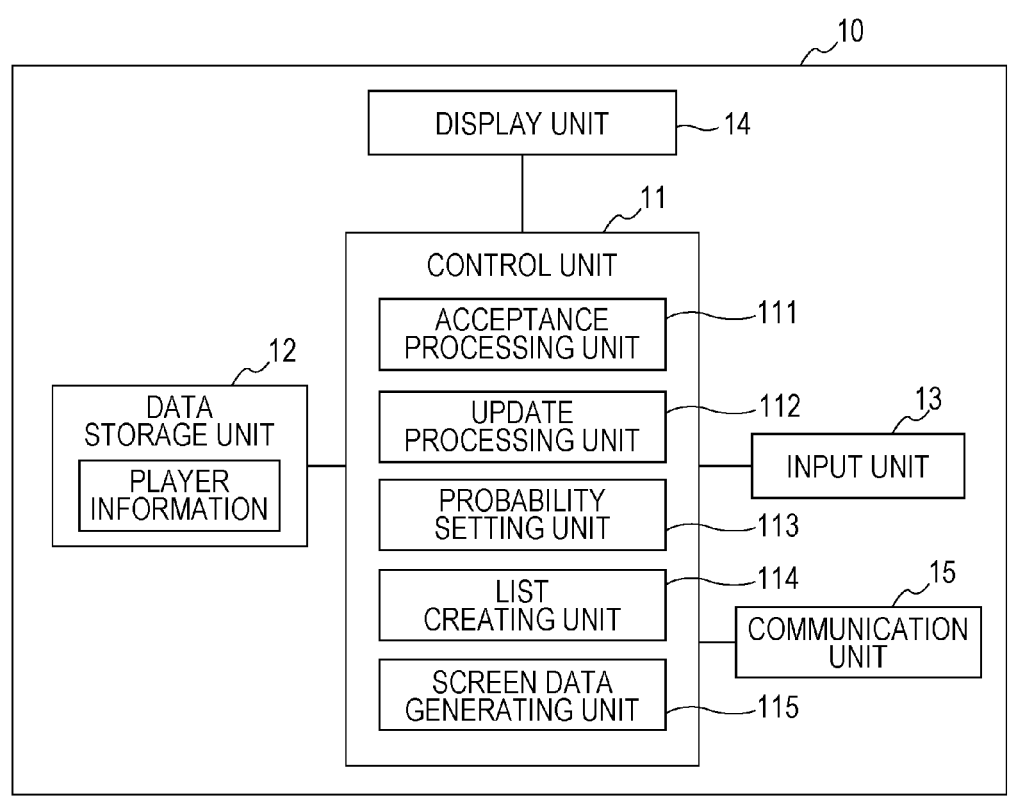
FIG. 2 is a block diagram showing a functional configuration of a server device 10 according to the embodiments.

FIG. 2 is a block diagram showing a functional configuration of the server device 10. The server device 10 of the present embodiment has a control unit 11, a data storage unit 12, an input unit 13, a display unit 14, and a communication unit 15.

The control unit 11 passes data between the units and performs overall control of the server device 10. The control unit 11 has an acceptance processing unit 111, an update processing unit 112, a probability setting unit 113, a list creating unit 114, and a screen data generating unit 115. Specific operation of each unit will be described later.

The data storage unit 12 stores player information which is information about players. The player information includes information about money possessed by the players in a game (which is money circulated in the game and is also hereinafter called virtual currency).

The input unit 13 is to input, by the system administrator, etc., various types of data and settings for a game. The input unit 13 is implemented by, for example, a keyboard, a mouse, etc.

The display unit 14 is to display operation screens for the system administrator, based on instructions from the control unit 11. The display unit 14 is implemented by, for example, a liquid crystal display (LCD) or the like.

The communication unit 15 is to perform communication with the player terminals 20. The communication unit 15 has a function serving as a receiving unit that receives various types of data and signals transmitted from the player terminals 20, and a function serving as a transmitting unit that transmits various types of data and signals to the player terminals 20 in response to instructions from the control unit 11. The communication unit 15 is implemented by, for example, a NIC (Network Interface Card) or the like.

<Player Terminals 20>

A player terminal 20 is an information processing terminal operated by a player (user) when playing a game. The player terminal 20 is, for example, a mobile phone terminal, a smartphone, a personal computer, a game machine, or the like, and transmits and receives information to/from the server device 10 accessible through the network 2.

Figure 3:
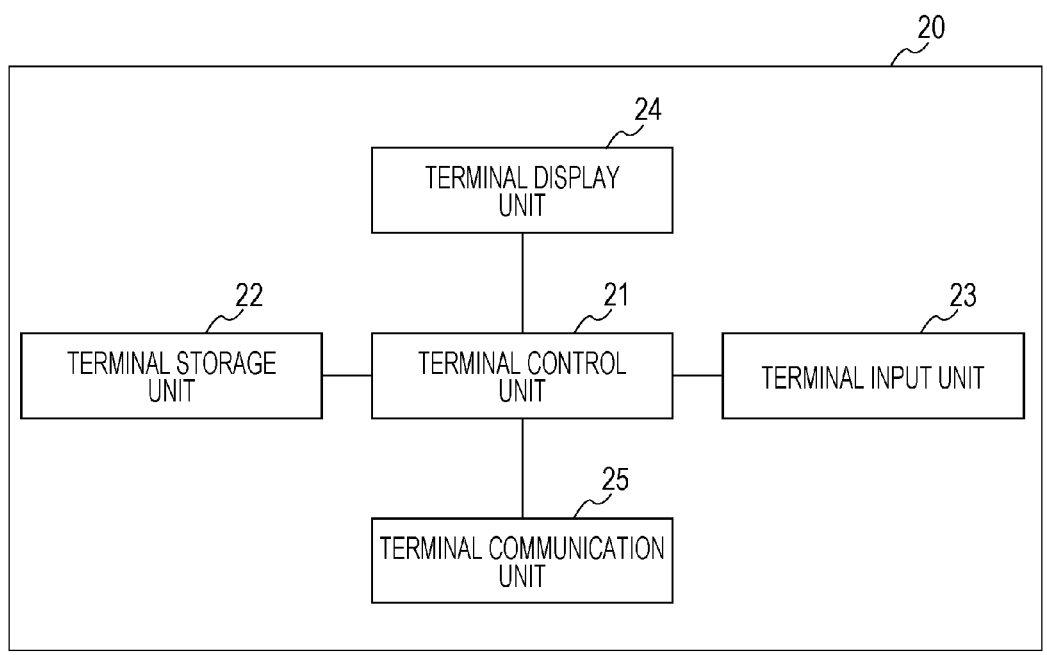
FIG. 3 is a block diagram showing a functional configuration of a player terminal 20 according to the embodiments.

FIG. 3 is a block diagram showing a functional configuration of the player terminal 20. The player terminal 20 of the present embodiment has a terminal control unit 21, a terminal storage unit 22, a terminal input unit 23, a terminal display unit 24, and a terminal communication unit 25.

The terminal control unit 21 passes data between the units and performs overall control of the player terminal 20.

The terminal storage unit 22 is connected via a bus to the terminal control unit 21, and performs the processes of referring to, reading, and rewriting data stored therein, in response to instructions from the terminal control unit 21.

The terminal input unit 23 is to perform various types of operation (game operation, text input operation, etc.) by the player. The terminal input unit 23 is implemented by, for example, operation buttons, a touch panel, etc.

The terminal display unit 24 is to display game screens (e.g., a game page containing an aid request link which will be described later) which are created based on game information and in response to instructions from the terminal control unit 21. The terminal display unit 24 is implemented by, for example, a liquid crystal display (LCD) or the like.

The terminal communication unit 25 is to perform communication with the server device 10, and has a function serving as a receiving unit that receives various types of data and signals transmitted from the server device 10, and a function serving as a transmitting unit that transmits various types of data and signals to the server device 10 in response to instructions from the terminal control unit 21. The terminal communication unit 25 is implemented by, for example, a NIC (Network Interface Card) or the like.

<<Summary of a Game>>

A summary of a game provided by the game system 1 will be briefly described.

A game (social game) provided in the present embodiment progresses by a player doing missions.

The "missions" refer to assignments and duties given to the player during the game, and are called in different ways depending on the game, e.g., "quests" and "searches". A mission is accomplished by performing a plurality of events.

The "events" refer to incidents occurring during the progress of the mission and include, for example, an event where the player gets money (virtual currency), items, etc., usable during the game and an event where the player encounters an enemy character and does battle with the enemy character. Note that when the player performs a certain event during a mission, a predetermined amount of action points which is determined according to the event is consumed. If the player's action points fall below the action points required to perform the event, then the player cannot perform the event any more and thus cannot proceed the mission. Note that the action points recover with the passage of time.

Information (parameters) on experience points, level (LV), hit points (HP), possessed money, possessed items, attack power, defense power, action points, etc., is set for each player as player information. The parameters change according to the progress of the game. For example, when the player performs a certain event, his/her experience points or possessed money increases as a result of the event. When the experience points reach a certain value or more, the player's level increases and accordingly his/her attack power, defense power, etc., increase, facilitating the progress of the game.

Therefore, by the player getting the opportunity to perform as many events as he/she can, he/she can allow the game to progress advantageously. In the present embodiment, by making a player more likely to receive a notification notifying of the occurrence of an event, the player becomes more likely to get the opportunity to participate in the event.

In the following, an example of the case of the occurrence of a "battle" which is one of the events occurring during the game will be described. Note that the battle refers to that a certain player engages in combat with an enemy character in the game system 1 (e.g., a character not controlled by the player (NPC)) in the game.

<For an Aid Request in a Battle>

When a mission progresses, a battle with an enemy character may take place. In the game of the present embodiment, by a player requesting his/her friend player for aid upon doing battle with an enemy character, the player and his/her friend player can do battle with the same enemy character in cooperation with each other. In other words, a plurality of players can simultaneously do battle with the same enemy character. By receiving aid from the friend, the player can even defeat a strong enemy character (e.g., a boss character) which is difficult for the player to defeat by him/herself. The setting is such that when such a strong enemy character is defeated, the player can get more virtual currency or a rare item, making the player want to get the opportunity to do battle with a stronger enemy character.

Specifically, a player who does battle with an enemy character notifies other players of the occurrence of the battle (event) (makes an aid request). Then, a player(s) having received the notification (aid request) participate(s) in the battle (event). By this, many players can get the opportunity to participate in an event and also the chance that the event can be cleared increases by the cooperation of many players.

<Method for an Aid Request>

An aid request is made by a player actually doing battle with an enemy character at that point in time to a plurality of other players. For a method for an aid request, for example, there is a method in which a player on the aid request transmitter side transmits an aid request email to players on the aid request receiver side through the network 2. In addition, there is a method in which a banner ad for an aid request or the like is displayed on a game page (my page in the game, etc.) which is displayed on a terminal display unit 24 of a player terminal 20 operated by a player on the aid request notification receiver side.

Figure 4:
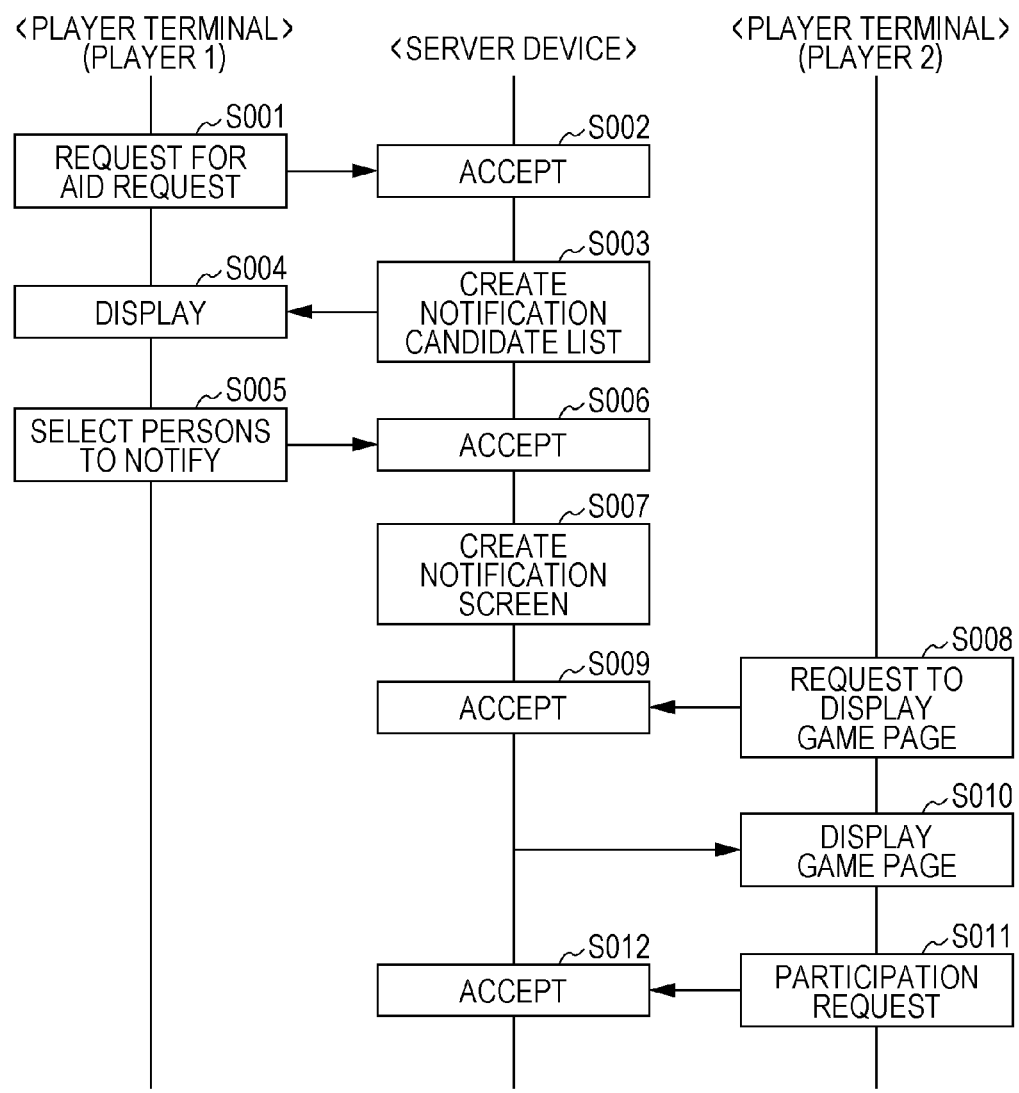
FIG. 4 is a diagram describing the flow of a process performed when an aid request is made in a game of a first embodiment.

An example of a process performed when an aid request is actually made will be described. FIG. 4 is a diagram describing the flow of a process performed when an aid request is made in the game of the first embodiment. Note that for simplification of description, description is made assuming that a battle has already started during the game. Note also that description is made such that a player on the aid request transmitter (notifying) side is player 1, and a player on the aid request receiver (notified) side is player 2.

First, a player (player 1) doing battle with a certain enemy character requests another player (player 2) for an aid request (S001). The request for an aid request is made by, for example, the player 1 pressing an aid request button (not shown) on a battle screen displayed on a terminal display unit 24 of a player terminal 20 operated by the player 1.

The request for an aid request made by the player 1 is transmitted to the server device 10 through the network 2 and accepted by the acceptance processing unit 111 (S002).

Figure 5:
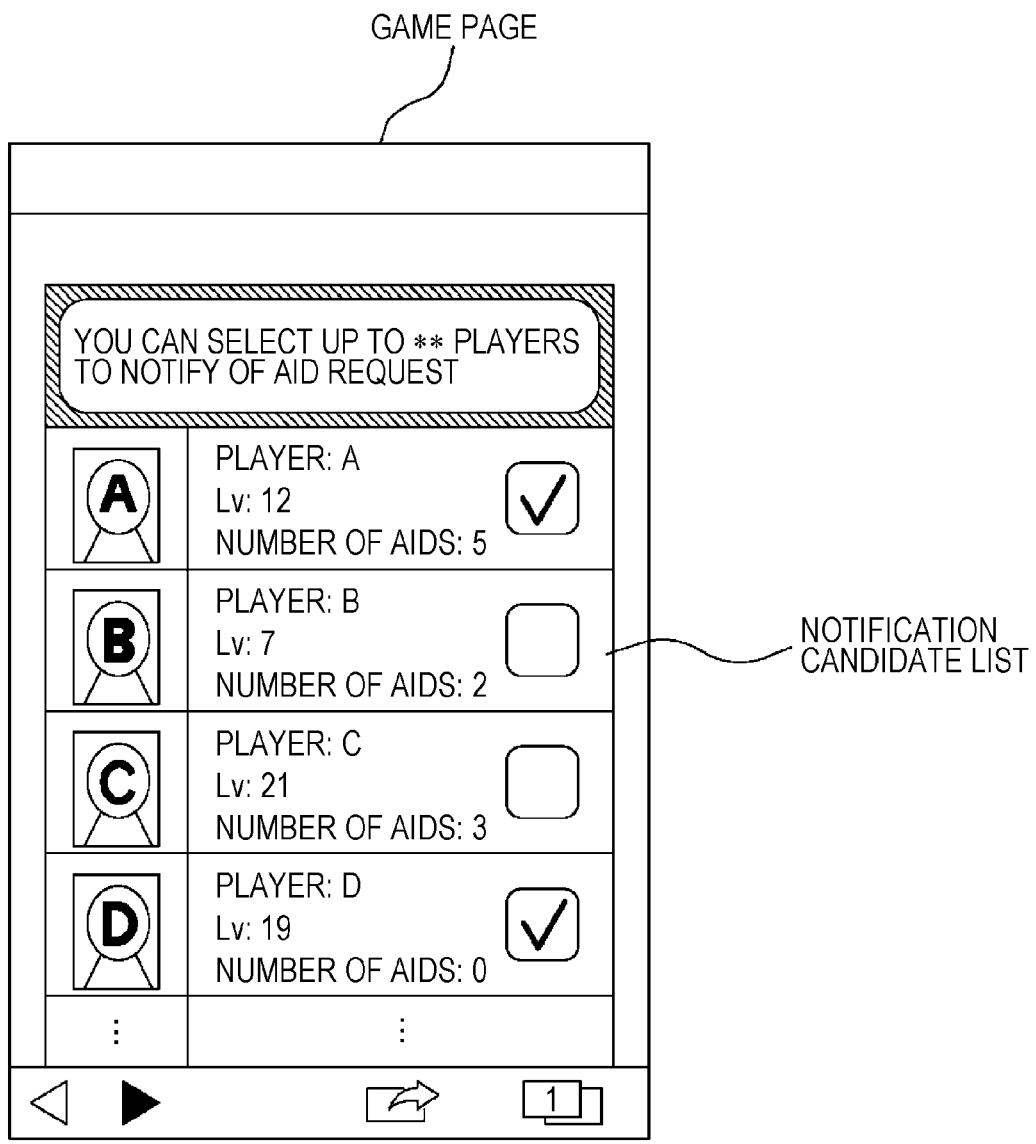
FIG. 5 is a diagram showing an example of a game page screen on which a notification candidate list is displayed.

When the request for an aid request has been accepted, the list creating unit 114 of the server device 10 creates a list for selecting players on the side of persons to notify of an aid request (hereinafter, also called a notification candidate list) (S003). FIG. 5 shows an example of a game page (game screen) on which a notification candidate list is displayed. In the notification candidate list is displayed information on a plurality of (e.g., 20) players extracted by the list creating unit 114 from among players other than the player 1. The displayed information includes parameters such as the levels (LV) and strengths of the players, the numbers of aids provided by the players to the player 1 so far, etc. The players displayed in the notification candidate list are candidate players who are persons to notify of an aid request. Note that extraction of players serving as notification candidates is performed based on a predetermined probability. Normally, the setting is such that a predetermined number of players are extracted at an even probability from among all players other than the player 1. Note, however, that extraction may be performed by referring to the strength of each player, the frequency of access to the game by each player, the depth of friendship of each player with the player 1, etc.

Data on the game page containing the notification candidate list (FIG. 5) created by the screen data creating unit 115 is transmitted to the player terminal 20 operated by the player 1, and a screen is displayed on the terminal display unit 24 (S004).

The player 1 views the screen displayed on the terminal display unit 24 and selects a predetermined number of players as persons to actually notify of an aid request from among the plurality of players displayed in the notification candidate list (S005). Note that for the players who are persons to notify of an aid request, instead of selecting the players by the player 1, an aid request may be notified to all players displayed in the notification candidate list, or the control unit 11 may select any player from the notification candidate list and notify the selected players of an aid request.

When the players to notify of an aid request are selected and the server device 10 accepts the selection results (S006), the screen data generating unit 115 generates data on a game page (not shown) containing a link for participating in the battle the player 1 is currently doing (hereinafter, also called an aid request link) (S007).

Thereafter, when a player other than the player 1 (here, the player 2) requests to display the game page screen containing the aid request link on a player terminal 20 (S008), the request is accepted by the acceptance processing unit 111 of the server device 10 (S009) and the game page screen requested by the player 2 is displayed on a terminal display unit 24 of the player 2 (S010).

That is, when there is access to the server device 10 from the player 2, a game page containing an aid request link is displayed on the terminal display unit 24 of the player terminal 20 operated by the player 2.

Note that the aid request link is displayed on the game screen as a banner ad button, and message information such as "Player 1 wants aid!" can be displayed. Note also that the information displayed in the aid request link can be changed in response to a request from the player 1 making the aid request. For example, the state of an enemy character against which the player 1 is battling (the strength, remaining HP, etc., of the enemy character) is displayed, or a reward that can be obtained when the enemy character is defeated is displayed. In addition, the configuration may be such that the display position or display time of the aid request link can be changed in response to a request from the player 1. The player 1 can encourage other players to participate in the battle by devising information to be displayed in the aid request link or the display mode of the aid request link.

Note that upon providing an aid request notification, instead of transmitting data on a game page containing an aid request link, email containing an aid request link may be transmitted.

The player 2 having received the aid request notification determines whether to aid and participate in the battle. If the player 2 aids and participates, the player 2 makes a participation request (S011). Specifically, the player 2 makes a participation request by pressing (touching) the aid request link button on the game page screen containing the aid request link which is displayed on the terminal display unit 24.

Then, the server device 10 accepts the participation request from the player 2 (S012), by which the player 2 can participate in the battle the player 1 is doing.

<<For an Aid Request Made in the Present Embodiment>>

In the above-described aid request, the player (player 2) on the aid request notification receiver side can do nothing but wait until notified of an aid request (S010 in FIG. 4). Namely, there is no means of calling for an aid request notification by the player 2 him/herself. Hence, even if the player 2 wants to participate in as many events (battles) as possible, it is difficult for the player 2 to sufficiently get the opportunity to participate. In such a case, the player 2 may get frustrated and lose his/her passion for the game.

In view of this, in the present embodiment, the player (player 2) on the aid request notification receiver side is allowed to broaden the opportunity to receive an aid request notification by him/herself. A specific process will be described below.

Figure 6:
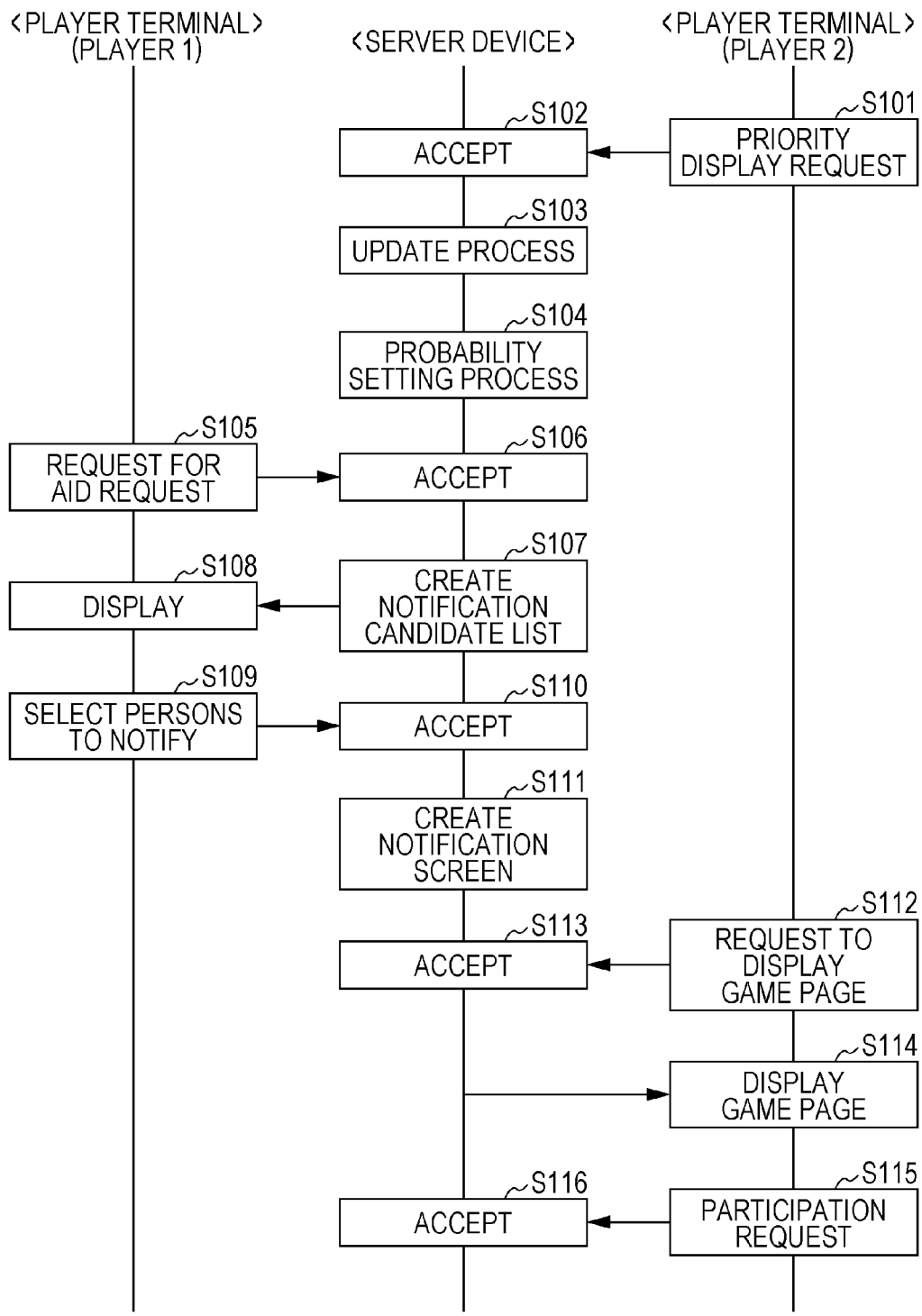
FIG. 6 is a diagram describing the flow of a process for making a player more likely to receive an aid request in the game of the first embodiment.

FIG. 6 is a diagram describing the flow of a process for making a player more likely to receive an aid request in the game of the present embodiment. As in the case of FIG. 4, description is made such that a player on the aid request transmitter side is player 1, and a player on the aid request receiver side is player 2.

In the present embodiment, before the player 1 makes a request for an aid request (S105 which will be described later), the player 2 makes a request to display him/herself in a notification candidate list on a priority basis (priority display request) (S101). The player 2 can increase the chance to receive an aid request notification from another player by allowing him/herself to be displayed in the notification candidate list on a priority basis. Hence, a priority display request is made before a notification candidate list is actually created (before a request for an aid request is made).

Though details will be described later, in the present embodiment, a priority display request can be made on the condition that a predetermined consideration is paid. At this time, the screen data generating unit 115 may create a screen (not shown) confirming the payment of the amount of consideration, and the screen may be displayed on a player terminal 20 operated by the player 2.

The priority display request made by the player 2 is transmitted to the server device 10 through the network 2 and accepted by the acceptance processing unit 111 (S102).

Then, the update processing unit 112 of the server device 10 performs an update process in which the amount of consideration for making the priority display request is subtracted from the amount of virtual currency possessed by the player 2 (possessed money) (S103).

Figure 7:
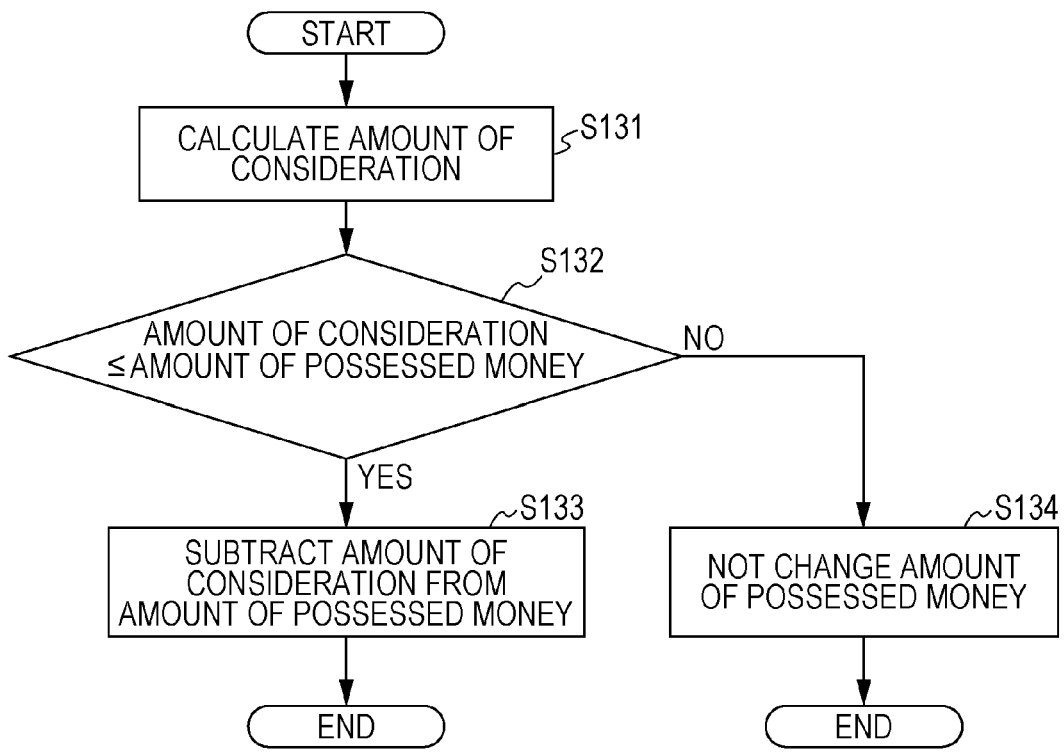
FIG. 7 is a diagram showing the flow of an update process.

FIG. 7 is a diagram showing the flow of the update process. First, the update processing unit 112 calculates an amount of consideration (virtual currency) charged for the priority display request made by the player 2 (S131). Namely, the magnitude of consideration charged for the priority display request is determined. Although here it is assumed that the magnitude of consideration (the amount of virtual currency)

charged for the priority display request is set in advance, the magnitude of consideration may be changed according to the display mode for when the player 2 is displayed in a notification candidate list, etc. Details will be described in a second embodiment.

Then, the update processing unit 112 refers to information about possessed money which is included in player information of the player (player 2) having made the priority display request, to compare the amount of the possessed money with the above-described amount of consideration (S132). If, as a result, the amount of virtual currency possessed by the player 2 (possessed money) is greater than or equal to the amount of consideration charged for the priority display request (Yes at S132), it is considered that the priority display request made by the player 2 has been accepted officially, and thus, the amount of consideration is subtracted from the amount of virtual currency possessed by the player 2, and the resulting amount of virtual currency is stored in the data storage unit 12 (S133). On the other hand, if the amount of virtual currency possessed by the player 2 is less than the amount of consideration charged for the priority display request (No at S132), it is considered that the priority display request made by the player 2 has been rejected, and thus, the amount of virtual currency possessed by the player 2 (possessed money) is not changed (S134).

Note that when the priority display request has been rejected in the process at S103, the screen data generating unit 115 generates data on a game page screen containing a message indicating that priority display cannot be performed (not shown). The generated data on the game page is transmitted through the network 2 to the player terminal 20 operated by the player (player 2) having made the priority display request, and a game page screen is displayed on a terminal display unit 24.

When the priority display request has been accepted and the amount of consideration is subtracted from the amount of possessed money of the player 2, the probability setting unit 113 performs the process of setting the probability of the player 2 being displayed in a notification candidate list (S104). In the present embodiment, the probability that the player (player 2) having made the priority display request is displayed in the notification candidate list is set higher than the probabilities that other players having not made priority display requests are displayed in the notification candidate list. For example, the probability is set such that the player 2 is displayed in the notification candidate list at a high probability of the order of 80 to 100%. Note, however, that the level of probability may change according to the amount of consideration.

Thereafter, when another player (here, the player 1) makes a request for an aid request (S105) and the acceptance processing unit 111 of the server device 10 accepts the request for an aid request (S106), a notification candidate list is created (S107). The processes performed at S105 to S107 are basically the same as those at the aforementioned S001 to S003.

At S107, the list creating unit 114 creates a notification candidate list based on the probabilities set in the above-described probability setting process (S104). Namely, the player 2 is displayed at a high probability in a notification candidate list to be created. By this, the chance of the player 2 receiving an aid request notification increases.

Note that when, despite the fact that the player 2 has made a priority display request, there is no request for an aid request (S105) thereafter from another player, a notification candidate list is not created and thus the player 2 cannot receive an aid request notification. Hence, when a request for an aid request is not made by another player before a predetermined time has elapsed since the player 2 has made a priority display request, it may be considered that the priority display request has been cancelled, and thus, the process of returning the amount of consideration charged for the priority display request to the player 2 may be performed.

The processes performed thereafter (S108 to S116) are substantially the same as those at S004 to S012 in FIG. 4.

In the game of the present embodiment, on the condition that the player 2 pays a consideration, the player 2 can increase the probability of him/herself (player 2) being displayed in an aid request notification candidate list displayed on a player terminal of another player (player 1). Namely, the player 2 becomes more likely to receive a notification notifying the occurrence of an event (a battle event in the above-described example). Since the player 2 can get the opportunity to participate in many events, the player 2 becomes more likely to obtain a reward for clearing of an event, or the zest for the game can be increased.

<<Variant>>

In order for the player 2 to actively make a priority display request, when the player 2 gets the opportunity to participate in an event (battle) as a result of making a priority display request, a prize may be provided to the player 2.

Figure 8:
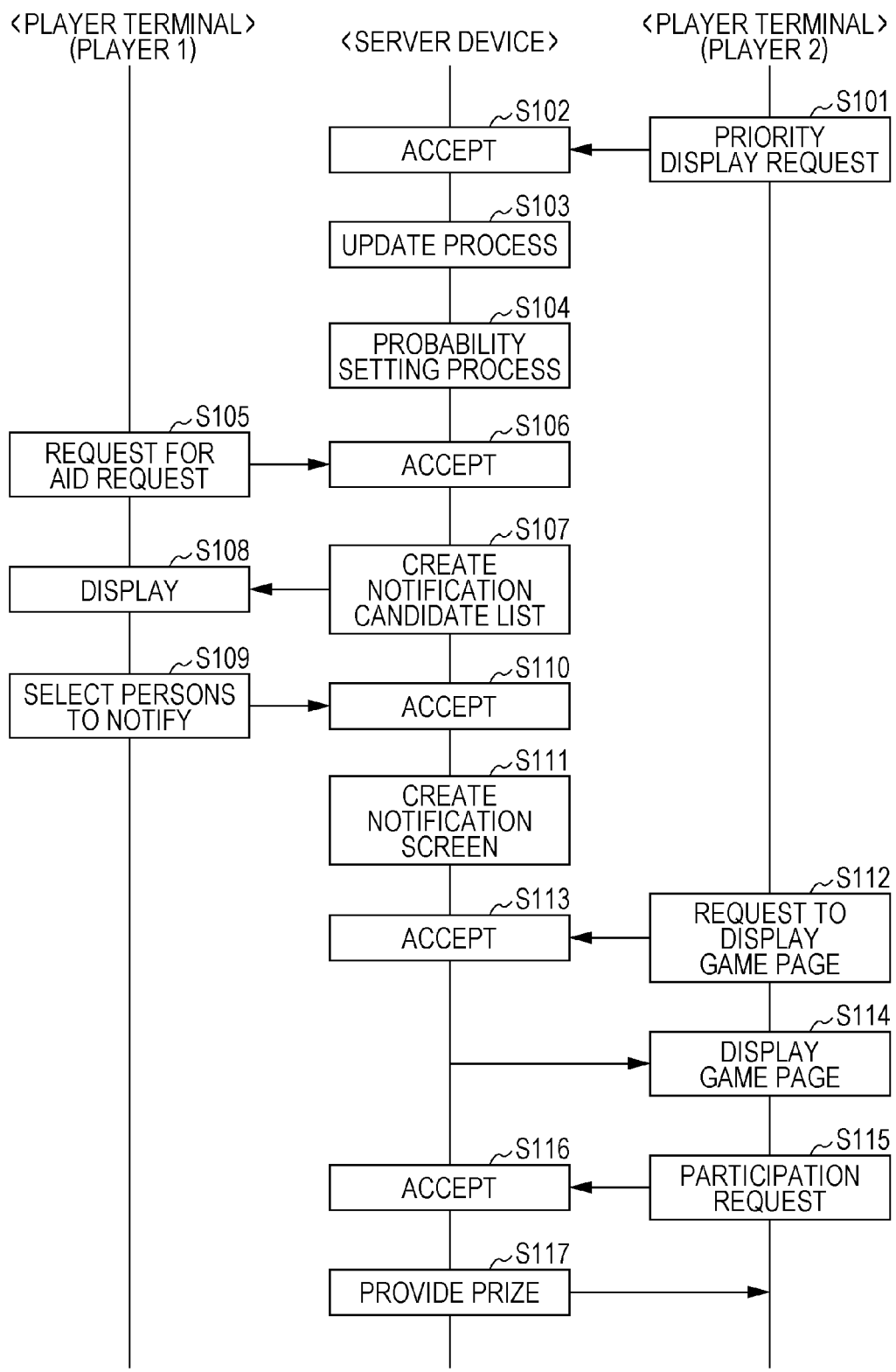
FIG. 8 is a diagram describing a variant of the flow of a process performed when a priority display request is made in the game of the first embodiment.

FIG. 8 is a diagram describing a variant of the flow of a process performed when a priority display request is made in the game of the present embodiment. The processes at S101 to S116 are the same as those in the above-described case of FIG. 6. In the variant, when the player 2 is actually selected as an aid request person from a notification candidate list created based on a priority display request made by the player 2, the update processing unit 112 performs the process of providing a predetermined prize to the player 2 having made the priority display request (S117). For example, when the server device 10 accepts a priority display request from the player 2 (S102) and accepts from the player 1 the selection of the player 2 as a person to notify of an aid request (S110), a predetermined amount of virtual currency is added to the amount of virtual currency possessed by the player 2 as the reward for success or a predetermined item is provided to the player 2, by which player information about the player 2 is changed and stored in the data storage unit 12. Alternatively, a predetermined prize may be provided only by making a priority display request.

The player 2 can get a prize by participating in an event (battle) by making a priority display request. That is, setting a prize gives the player 2 an incentive to actively participate in an event. By this, the number of event participants can be increased easily, enabling the game to be more active.

Second Embodiment

In a second embodiment, an example will be described in which according to the magnitude of consideration paid by a player making a priority display request, the probability of the player being displayed in a notification candidate list or a display mode of the player changes.

Figure 9:
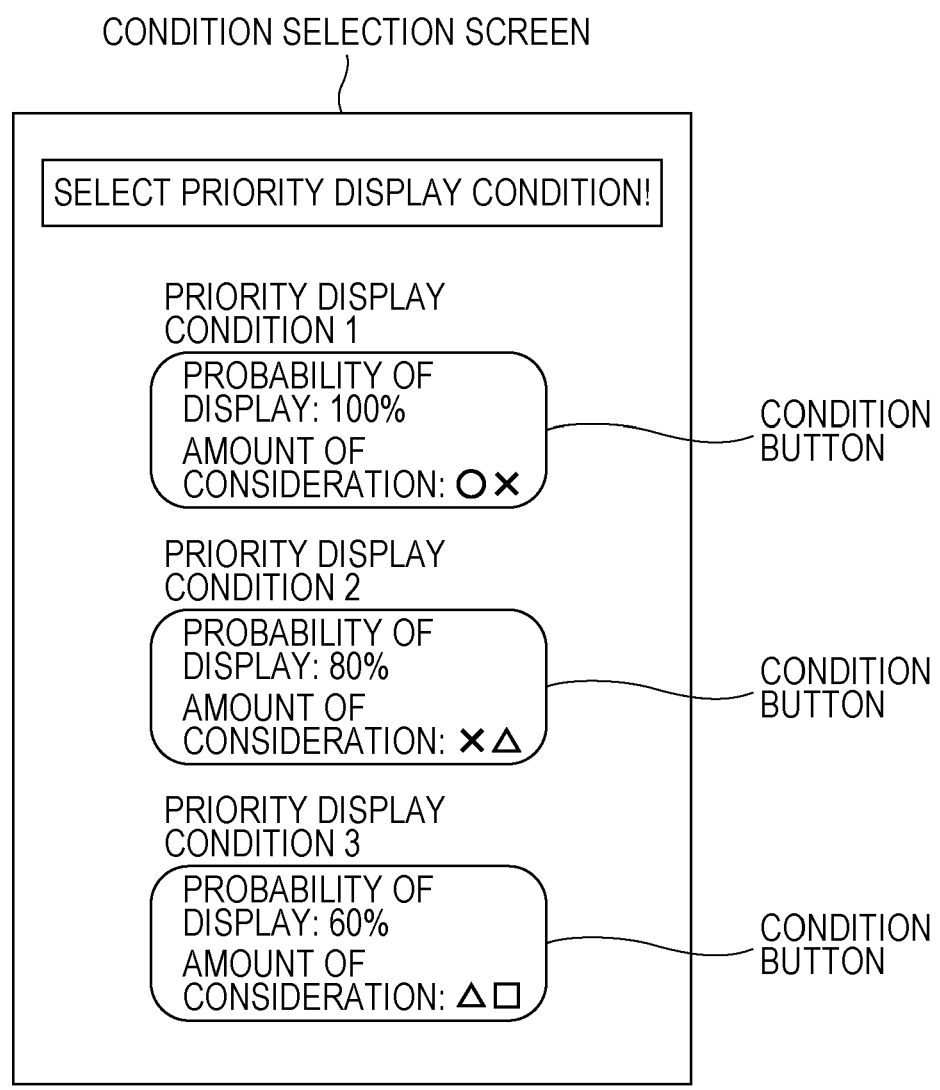
FIG. 9 is a diagram showing an example of a condition selection screen displayed upon making a priority display request.

In the second embodiment, at a stage where a player (player 2) who makes a priority display request makes a priority display request (S101 in FIG. 6), the player 2 can select a condition and the amount of consideration for when the player 2 is displayed in a notification candidate list on a priority basis. FIG. 9 is a diagram showing an example of a condition selection screen displayed upon making a priority display request.

When the player 2 attempts to make a priority display request, a condition selection screen such as that shown in FIG. 9 is displayed. On the condition selection screen are displayed a plurality of condition buttons in which the probabilities of the player 2 being displayed in a notification candidate list and the amounts of consideration according to the probabilities are described. The player 2 can allow him/herself to be displayed in the notification candidate list in a desired condition (probability) by selecting and pressing one of the plurality of condition buttons. In the case of FIG. 9, the condition is set such that the larger the amount of consideration charged for a priority display request, the higher the probability of the player 2 being actually displayed in the notification candidate list. By this, the player (player 2) who makes a priority display request can receive a notification notifying the occurrence of an event (an aid request notification in a battle) while taking into account the amount of virtual currency possessed thereby. That is, the player 2 can more efficiently get the opportunity to participate in an event. For example, when the player 2 definitely wants to get the opportunity to participate in an event, the player 2 selects a condition with a high probability of the player 2 being displayed in the notification candidate list, and when the player 2 does not have much possessed money, the player 2 selects a condition with a low probability of the player 2 being displayed.

In addition, the configuration may be such that the player 2 can set a condition for a priority display request by him/herself. FIG. 10 is a diagram showing an example of a condition setting screen displayed upon making a priority display request. In FIG. 10, the player 2 can make a selection of a display position, a display mode, etc., for when the player 2 is displayed in a notification candidate list.

In the setting of the display position for when the player 2 is displayed in a notification candidate list, the player 2 can set in which position from the top he/she is displayed in a notification candidate list (see FIG. 5). For example, comparing the case in which the player 2 is displayed in the top position of the list with the case in which the player 2 is displayed in a position of the list that cannot be viewed unless scrolling the screen, the player 2 displayed in the top position of the list is more noticeable and thus is highly likely to be actually selected as an aid request person. Hence, the setting is performed such that the higher the position in the list, the higher the amount of consideration. As such, the amount of consideration is set according to the position for when the player 2 is displayed in the notification candidate list, and the player 2 is allowed to select a desired display location by him/herself.

Likewise, the display mode for when the player 2 is displayed in the notification candidate list can be set. For example, upon displaying the player 2 in a notification candidate list, the player 2 is displayed in a blinking manner or is displayed as a recommended player. By noticeably displaying the player 2 in such a manner, the chance of the player 2 being actually selected as an aid request person increases. In this case, the setting is performed such that the more noticeable the display mode, the higher the amount of consideration.

In addition, upon displaying the player 2 in the notification candidate list, a message may be allowed to be displayed. For example, by displaying a message, e.g., "Aid and participate at all times!", in the notification candidate list, the chance of the player 2 being selected as an actual aid request notification person increases. In this case, the setting is performed such that the amount of consideration increases according to the length of a message or the size of characters. In addition, as described above, the probability of the player 2 being displayed in the notification candidate list may be allowed to be set.

By those settings, the player 2 can get a greater opportunity to participate in an event, according to the amount of consideration.

Other Embodiments

The above-described embodiments are provided to facilitate understanding of the present invention and are not to be construed as limiting the present invention. Needless to say, the present invention may be changed or modified without departing from the spirit and scope thereof and the present invention includes equivalency thereof. In addition, embodiments described below are also included in the present invention.

<For the Probability Setting Unit and the List Creating Unit>

In the above-described embodiments, when a priority display request is accepted from a player, the player may be always displayed in a notification candidate list for a fixed period of time. At that time, the player may be displayed in the topmost position of the notification candidate list. In addition, when priority display requests are accepted from a plurality of players, a player having made a more recent priority display request may be displayed in a higher position of a notification candidate list.

<For the Consideration for a Priority Display Request>

Although in the above-described embodiments, as a consideration charged upon making a priority display request, virtual currency possessed by a player who makes the priority display request in a game is used, the consideration for a priority display request is not limited thereto. For example, of player information, an item possessed by the player or the aforementioned action points may be consumed as the consideration for a priority display request. Alternatively, a dedicated item for making a priority display request may be set, and a priority display request may be allowed to be made only when the player possesses the dedicated item. In this case, modes (a display location and a display method) for when the player is actually displayed in a notification candidate list may be allowed to change depending on the number of dedicated items used.

<For the Payment of a Consideration>

In the above-described embodiments, a priority display request is made by the player 2 on the condition that the amount of consideration charged for the priority display request is paid. In contrast, payment of a consideration may be made after the player 2 makes a priority display request and a notification candidate list is actually created. For example, when, at a stage where a notification candidate list is created, the player 2 is displayed in the list, the player 2 may pay the normal amount of consideration, and when the player 2 is not displayed in the list, the player 2 may pay a reduced amount of consideration.

<For Game Media>

Although in the above-described embodiments an example is described in which parameters such as attack power, defense power, and HP are set as player information, and a battle with an enemy character progresses according to the parameters, battle may be done using a predetermined game medium. For example, when cards are used as a game medium, for a plurality of types of cards set with parameters such as attack power and defense power, respectively, a deck which is a combination of predetermined cards selected from among cards possessed by players may be built, and battle may be done with an enemy character, etc., using the deck.

<Information Processing Device>

Although in the above-described embodiments description is made using, as an example, the game system 1 including one server device 10 as an example of an information processing device, the configuration is not limited thereto and a game system 1 may include a plurality of server devices 10 as information processing devices. Specifically, a plurality of server devices 10 may be connected through a network 2, and the server devices 10 may perform various types of processes in a distributed manner.

Alternatively, the configuration may be such that a player terminal 20 has part of the function of an information processing device. In this case, the server device 10 and the player terminal 20 configure an information processing device.

<Game Program>

In the game system 1 in the above-described embodiments, an example is described in which by allowing the server device 10 and a player terminal 20 to operate in cooperation with each other, a player becomes more likely to receive a notification notifying the occurrence of an event and thus becomes more likely to get the opportunity to participate in an event such as a battle. The present invention also includes a game program for performing those processes. Specifically, the server device 10 serving as an information processing device and a player terminal 20 may perform the above-described processes based on the game program.

What is claimed is:

1. A server device connected to a plurality of player terminals through a network and controlling a game that causes an event where a plurality of players can participate to occur, the server device comprising:
    a storage unit that stores data on player information including information about an amount of virtual currency possessed by each player in the game;
    an acceptance processing unit that accepts from a corresponding player terminal a priority display request for displaying a player on a priority basis in a notification candidate list in which are displayed players serving as candidates for notification destinations to notify of occurrence of an event;
    an update processing unit that performs, when the priority display request is accepted, an update by subtracting data on a consideration charged for the priority display request from data on player information about the player requesting for priority display, and allowing the storage unit to store the data on the player information;
    a probability setting unit that sets a probability of the player requesting for priority display being selected as a player displayed in the notification candidate list higher than probabilities of other players not requesting for priority display being selected; the probability set based on a selection from a plurality of probabilities for being selected as the player displayed in the notification candidate list, each of the plurality of probabilities associated with a magnitude for the consideration charged for the priority display request; and
    a list creating unit that creates the notification candidate list in which a plurality of players selected based on the probabilities set by the probability setting unit are displayed as players serving as candidates for notification destinations.

2. The server device according to claim 1, wherein the probability setting unit changes the probability of the player requesting for priority display being selected as a player displayed in the notification candidate list, according to a selection of the magnitude of consideration charged for the priority display request.

3. The server device according to claim 1, wherein
    when the player requesting for priority display is selected as a player displayed in the notification candidate list by paying the consideration,
    the list creating unit changes one or both of a display position and a display mode for when the player requesting for priority display is displayed in the notification candidate list, according to a magnitude of consideration charged for the priority display request.

4. The server device according to claim 1, wherein
    when the player requesting for priority display is selected as a player displayed in the notification candidate list by paying the consideration,
    the acceptance processing unit provides a prize for having been selected in the notification candidate list, to the player requesting for priority display.

5. A non-transitory computer-readable storage medium storing a game program that causes an information processing device to perform a game causing an event where a plurality of players can participate to occur, and that causes the information processing device to perform:
    a process of storing, in a storage unit, data on player information including information about an amount of virtual currency possessed by each player in the game;
    a process of accepting from a player terminal a priority display request for displaying a player on a priority basis in a notification candidate list in which are displayed players serving as candidates for notification destinations to notify of occurrence of an event;
    a process of performing, when the priority display request is accepted, an update by subtracting data on a consideration charged for the priority display request from data on player information about the player requesting for priority display, and allowing the storage unit to store the data on the player information;
    a process of setting a probability of the player requesting for priority display being selected as a player displayed in the notification candidate list higher than probabilities of other players not requesting for priority display being selected, the probability set based on a selection from a plurality of probabilities for being selected as the player displayed in the notification candidate list, each of the plurality of probabilities associated with a magnitude for the consideration charged for the priority display request; and
    a process of creating the notification candidate list in which a plurality of players selected based on the set probabilities are displayed as players serving as candidates for notification destinations.

* * * * *